US009347467B2

(12) United States Patent
Song

(10) Patent No.: US 9,347,467 B2
(45) Date of Patent: May 24, 2016

(54) METHOD FOR CONTROLLING FLOW RATE OF ATTACHMENT FOR CONSTRUCTION EQUIPMENT

(75) Inventor: Seong Ho Song, Incheon (KR)

(73) Assignee: Doosan Infracore Co., Ltd., Incheon (KR)

( * ) Notice: Subject to any disclaimer, the term of this patent is extended or adjusted under 35 U.S.C. 154(b) by 408 days.

(21) Appl. No.: 13/991,579

(22) PCT Filed: Dec. 22, 2011

(86) PCT No.: PCT/KR2011/010006
§ 371 (c)(1),
(2), (4) Date: Jun. 4, 2013

(87) PCT Pub. No.: WO2012/087052
PCT Pub. Date: Jun. 28, 2012

(65) Prior Publication Data

US 2013/0255241 A1 Oct. 3, 2013

(30) Foreign Application Priority Data

Dec. 23, 2010 (KR) ........................ 10-2010-0133767

(51) Int. Cl.
*F16D 31/02* (2006.01)
*F15B 15/18* (2006.01)
(Continued)

(52) U.S. Cl.
CPC ................. *F15B 15/18* (2013.01); *E02F 3/963* (2013.01); *E02F 9/2235* (2013.01); (Continued)

(58) Field of Classification Search
CPC ............................... E02F 9/2246; F02D 29/04
USPC ........................................................... 60/431
See application file for complete search history.

(56) References Cited

U.S. PATENT DOCUMENTS 5,553,407 A * 9/1996 Stump ..................... E03F 5/145
414/694
6,990,807 B2 * 1/2006 Bird ........................ F15B 11/17
60/422
7,543,447 B2 * 6/2009 Itoga ..................... B60W 10/06
60/431

FOREIGN PATENT DOCUMENTS

JP 05-065903 A 3/1993
JP 06-033905 A 2/1994
(Continued)

OTHER PUBLICATIONS

Search Report dated Jul. 30, 2012 and written in Korean with English translation attached for International Application No. PCT/KR2011/010006 filed Dec. 22, 2011, 5 pages.

*Primary Examiner* — Michael Leslie
(74) *Attorney, Agent, or Firm* — John D. Veldhuis-Kroeze; Westman, Champlin & Koehler, P.A.

(57) ABSTRACT

A method of controlling a flow rate of an attachment for construction equipment of the present disclosure, in which an engine and a pump are connected to a control device to which various control information according to equipment characteristics, user setting information from an instrument panel, engine rpm adjustment information through an engine control dial, or the like is inputted, and an attachment is connected to the pump so as to perform specific work, includes selecting, on the instrument panel, an attachment to perform work and an optimum engine rpm according to the attachment; adjusting the flow rate by controlling an angle of a swash plate of the pump; and adjusting additionally a supply flow rate of the attachment by resetting an engine rpm when adjustment to the flow rate is necessary while performing the attachment work.

5 Claims, 5 Drawing Sheets

(51) Int. Cl.

| | |
|---|---|
| ***E02F 9/22*** | (2006.01) |
| ***F15B 11/042*** | (2006.01) |
| ***F02D 29/04*** | (2006.01) |
| ***E02F 3/96*** | (2006.01) |

(52) U.S. Cl.

CPC ............ *E02F 9/2246* (2013.01); *E02F 9/2296* (2013.01); *F02D 29/04* (2013.01); *F15B 11/0423* (2013.01); *F15B 2211/20523* (2013.01); *F15B 2211/20546* (2013.01); *F15B 2211/255* (2013.01); *F15B 2211/6651* (2013.01); *F15B 2211/6652* (2013.01); *F15B 2211/6654* (2013.01); *F15B 2211/705* (2013.01)

(56) References Cited

FOREIGN PATENT DOCUMENTS

| | | | |
|---|---|---|---|
| JP | 06-057787 | A | 3/1994 |
| JP | 08-020973 | A | 1/1996 |
| JP | 2002-038534 | A | 2/2002 |

* cited by examiner

METHOD FOR CONTROLLING FLOW RATE OF ATTACHMENT FOR CONSTRUCTION EQUIPMENT

CROSS-REFERENCE TO RELATED APPLICATION

This Application is a Section 371 National Stage Application of International Application No. PCT/KR2011/010006, filed Dec. 22, 2011 and published, not in English, as WO2012/087052 on Jun. 28, 2012.

FIELD OF THE DISCLOSURE

The present disclosure relates to a method of controlling a flow rate of an attachment for construction equipment, and more particularly, to a method of controlling a flow rate of an attachment for construction equipment, capable of additionally control the flow rate through adjustment of an engine rpm after controlling the flow rate through adjustment of an angle of a swash plate of a pump.

BACKGROUND OF THE DISCLOSURE

In general, construction equipment performs work by coupling various attachments to a work arm in accordance with necessity of work.

For example, in a case of an excavator that is representative construction equipment, various attachments such as a bucket, a breaker, a vibrator, a hammer, and the like are used by being attached by a coupler installed at a lower end side of an excavator arm and a lower end side of a link.

FIG. 1 illustrates a circuit diagram for controlling a flow rate of an attachment for construction equipment related to the present disclosure.

As illustrated in FIG. 1, the circuit for controlling a flow rate of an attachment for construction equipment is configured in a type in which an engine 140 and a pump 150 are connected to a control device 120 to which various control information according to equipment characteristics, user setting information from an instrument panel 110, engine rpm adjustment information through an engine control dial 130, or the like is inputted, and an attachment 180 is connected to the pump 150 so as to perform specific work.

In FIG. 1, reference numeral 160, which is not described, refers to a flow rate control regulator, and reference numeral 170, which is not described, refers to an electronic proportional pressure reducing valve.

Meanwhile, in the related art, when performing the attachment work for the construction equipment, an engine is operated at a setting work rpm, and when power is insufficient while performing the attachment work, the work is performed by forcibly raising the engine rpm by manipulating a separate engine control dial.

In addition, in the related art, when performing the attachment work for the construction equipment, only a maximum value limit of an angle of a swash plate (LPM) of a pump is determined in advance, and the angle of the swash plate is merely moved within the preset limit of the angle of the swash plate of the pump by pressure formed at the time of performing work such as manipulation of a lever, such that there is a problem in that a user may not adjust the flow rate by directly controlling the angle of the swash plate of the pump.

As such, in the related art, because the flow rate may not be additionally increased even when the flow rate of the attachment becomes deficient while performing work, there is a problem in that work, which requires a large amount of force, may not be performed.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

The present disclosure has been made in consideration of the above problems in the related art, and an aspect of the present disclosure is to provide a method of controlling a flow rate of an attachment for construction equipment, capable of achieving convenience of adjusting a flow rate of an attachment by allowing a control range of a flow rate of an attachment to be enlarged.

Another an aspect of the present disclosure is to provide a method of controlling a flow rate of an attachment for construction equipment, capable of allowing work, which may not be performed only by controlling the flow rate through adjustment of the angle of the swash plate a pump, to be performed.

To achieve the above aspect of present disclosure, a method of controlling a flow rate of an attachment for construction equipment of the present disclosure includes selecting, on an instrument panel, an attachment to perform work and an optimum engine rpm according to the attachment; setting a flow rate of a pump; and adjusting additionally a supply flow rate of the attachment by resetting an engine rpm while performing the attachment work.

That is, a method of controlling a flow rate of an attachment for construction equipment of the present disclosure, in which an engine and a pump are connected to a control device to which various control information according to equipment characteristics, user setting information from an instrument panel, engine rpm adjustment information through an engine control dial, or the like is inputted, and an attachment, which performs specific work using working oil supplied from the pump, is connected, includes selecting, on the instrument panel, an attachment to perform work and an optimum engine rpm according to the attachment; adjusting the flow rate by controlling an angle of a swash plate of the pump; and adjusting additionally a supply flow rate of the attachment by resetting an engine rpm when adjustment to the flow rate is necessary while performing the attachment work.

According to the method of controlling a flow rate of an attachment for construction equipment of the present disclosure, as an adjustment range of a flow rate of an attachment may be enlarged compared to the related art in which a flow rate is adjusted only by an angle of a swash plate of a pump, and thus an additional adjustment of the flow rate in a process of attachment work is facilitated, thereby highly improving not only convenience for a worker but also workability and productivity, and achieving efficiency of the construction equipment and reduction in fuel consumption.

DESCRIPTION OF MAIN REFERENCE NUMERALS OF DRAWINGS

110: Instrument panel
120: Controller
140: Engine
150: Pump
180: Attachment

DETAILED DESCRIPTION

Hereinafter, specific technical contents of the present disclosure for achieving the object will be described in detail with reference to the accompanying drawings.

Figure 1:
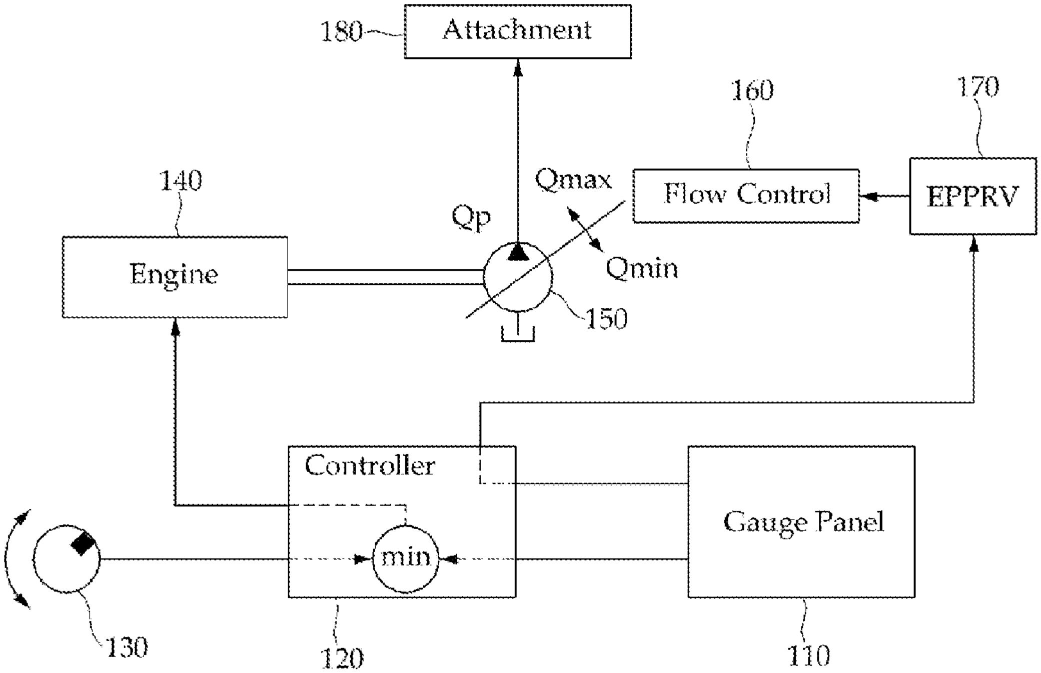
FIG. 1 is a circuit diagram for controlling a flow rate of an attachment for construction equipment related to the present disclosure.
Figure 2:
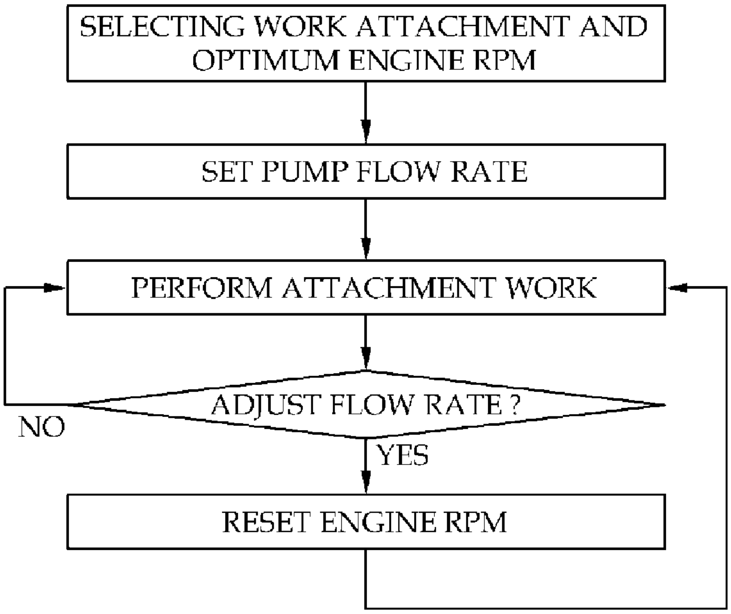
FIG. 2 is a flow chart for controlling a flow rate of an attachment for construction equipment according to the present disclosure.

FIG. 2 illustrates a flow chart for controlling a flow rate of an attachment for construction equipment according to the present disclosure.

As illustrated in FIG. 2, a method of controlling a flow rate of an attachment for construction equipment of the present disclosure, which is configured as a method of controlling a flow rate of an attachment for the construction equipment in which an engine 140 and a pump 150 are connected to a control device 120 to which various control information according to equipment characteristics, user setting information from an instrument panel 110, engine rpm adjustment information through an engine control dial 130, or the like is inputted, and an attachment 180 is connected to the pump 150 so as to perform specific work, includes selecting, on the instrument panel 110, an attachment to perform work and an optimum engine rpm according to the attachment;

adjusting the flow rate by controlling an angle of a swash plate of the pump; and additionally adjusting a supply flow rate of the attachment by resetting an engine rpm when adjustment to the flow rate is necessary while performing the attachment work.

Figure 3:
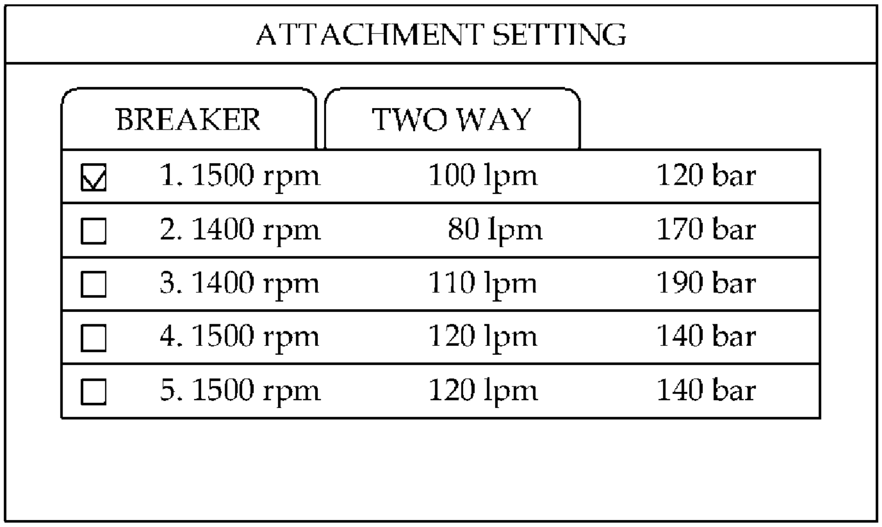
FIG. 3 is an attachment setting screen of an instrument panel according to the present disclosure.

In the method of controlling a flow rate of an attachment for construction equipment of the present disclosure, in the selecting of the attachment to perform work and the optimum engine rpm according to the attachment, as illustrated in FIG. 3, values of an engine rpm and an attachment flow rate according to equipment characteristics and an attachment specification are set through an attachment setting screen presented on the instrument panel 110.

Figure 4:
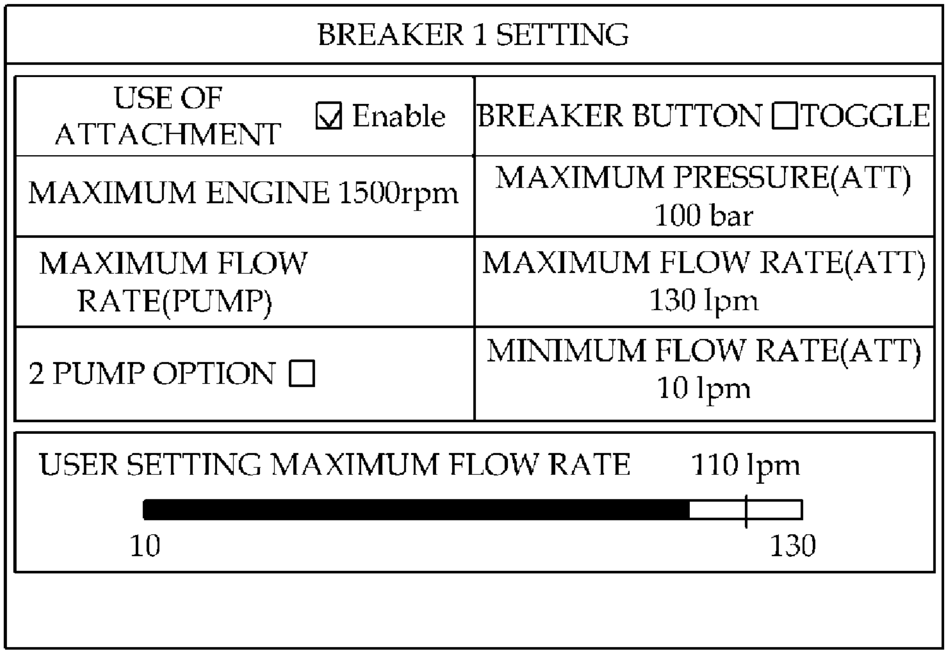
FIG. 4 is an attachment flow rate setting screen of the instrument panel according to the present disclosure.

Further, in the setting of the flow rate of the pump, as illustrated in FIG. 4, a flow rate range, which a user intends to actually use, is set through a user setting maximum flow rate on a flow rate setting screen on the instrument panel 110.

The user setting maximum flow rate may be set within a range of a maximum pump flow rate value which a vehicle may output according to a maximum engine rpm, a maximum flow rate value which allows the corresponding attachment to be operated, and a minimum flow rate value which allows the corresponding attachment to be operated, and becomes a maximum value of a real time flow rate value which is actually used on the main screen.

In the method of controlling of a flow rate of an attachment for construction equipment of the present disclosure, the setting of the attachment may be applied by a routine which only an administrator may access.

In the method of controlling a flow rate of an attachment for construction equipment of the present disclosure, after the engine rpm is primarily fixed to be operated in the most efficient section as described above, the adjusting of the angle of the swash plate of the pump is performed.

Figure 5A:
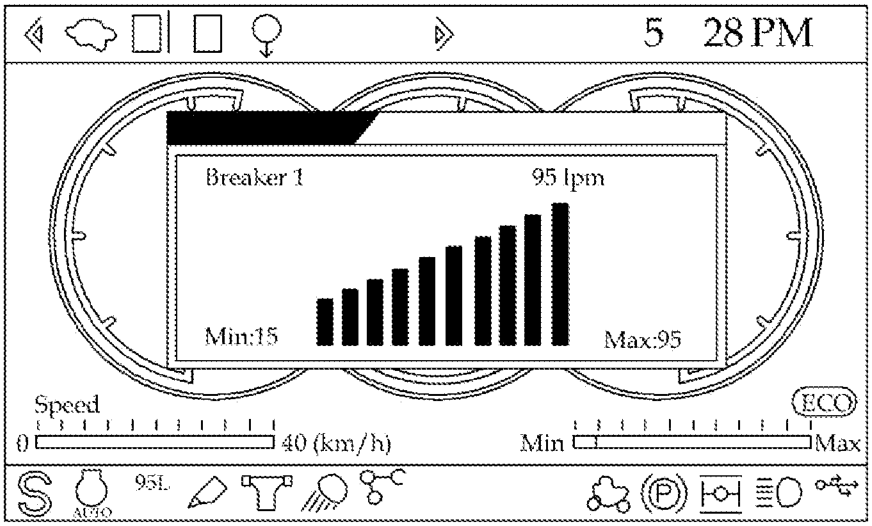
FIG. 5*a* is a main screen for controlling a flow rate by adjusting an angle of a swash plate according to the present disclosure.
Figure 5B:
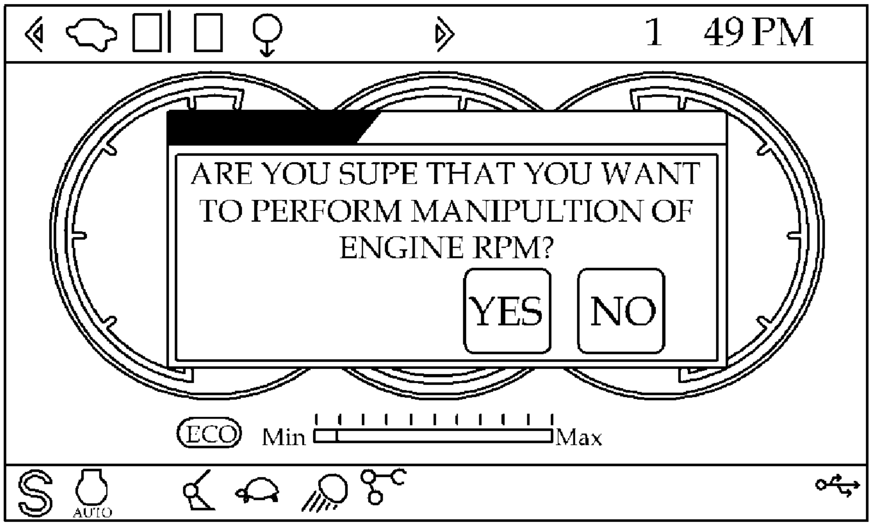
FIG. 5*b* is a main screen for selecting manipulation implementation of an engine rpm according to the present disclosure.
Figure 5C:
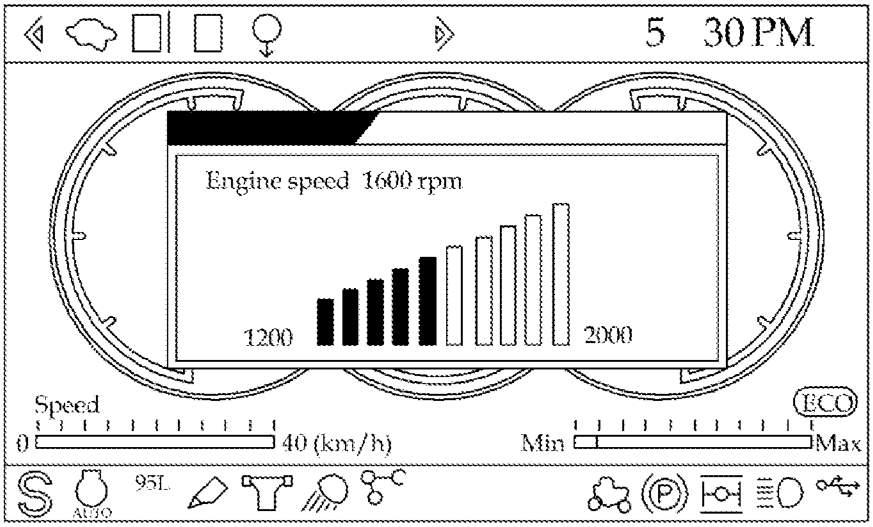
FIG. 5*c* is a main screen for implementing manipulation of an engine rpm according to the present disclosure.

FIG. 5*a* is a main screen for controlling a flow rate by adjusting an angle of the swash plate according to the present disclosure, FIG. 5*b* is a main screen for selecting manipulation implementation of an engine rpm according to the present disclosure, and FIG. 5*c* is a main screen for implementing manipulation of an engine rpm according to the present disclosure.

In the method of controlling a flow rate of an attachment for construction equipment of the present disclosure, the flow rate is first adjusted by adjusting the angle of the swash plate of the pump, and in a case in which a desired operation may not be performed only by adjusting the angle of the swash plate of the pump, a flow rate, which allows a desired operation to be operated, is generated by controlling an engine rpm.

This helps improvement of fuel efficiency in a section in which the flow rate may be adjusted only by adjusting the angle of the swash plate, and provides a means which may control the flow rate quickly and conveniently by providing the user with two interfaces.

In the method of controlling a flow rate of an attachment for construction equipment of the present disclosure, the flow rate may be controlled through adjustment of the angle of the swash plate and engine rpm on an attachment setting pop-up on the main screen.

That is, the flow rate may be controlled through adjustment of the angle of the swash plate of the pump on a screen for controlling the flow rate by adjusting the angle of the swash plate, as illustrated in FIG. 5*a*, and at this time, the control of the flow rate is performed within a user maximum flow rate range that is set through the attachment setting screen.

In addition, in the method of controlling a flow rate of an attachment for construction equipment of the present disclosure, even after controlling the flow rate through adjusting the angle of the swash plate of the pump during a process of attachment work, the flow rate may be controlled by adjusting the engine rpm, and at this time, the control of the flow rate is performed within a maximum flow rate range that the construction equipment and the attachment allow.

At the time of controlling the flow rate by adjusting the engine rpm, an initial value of the engine rpm starts from an optimal engine speed with respect to the corresponding model.

There is a rpm section in which most efficient fuel efficiency is outputted for every engine mounted in the construction equipment, and the value thereof is stored in advance in a controller in accordance with the engine.

Therefore, the flow rate may be controlled by adjusting the engine rpm by starting from the optimal engine speed.

Figure 6:
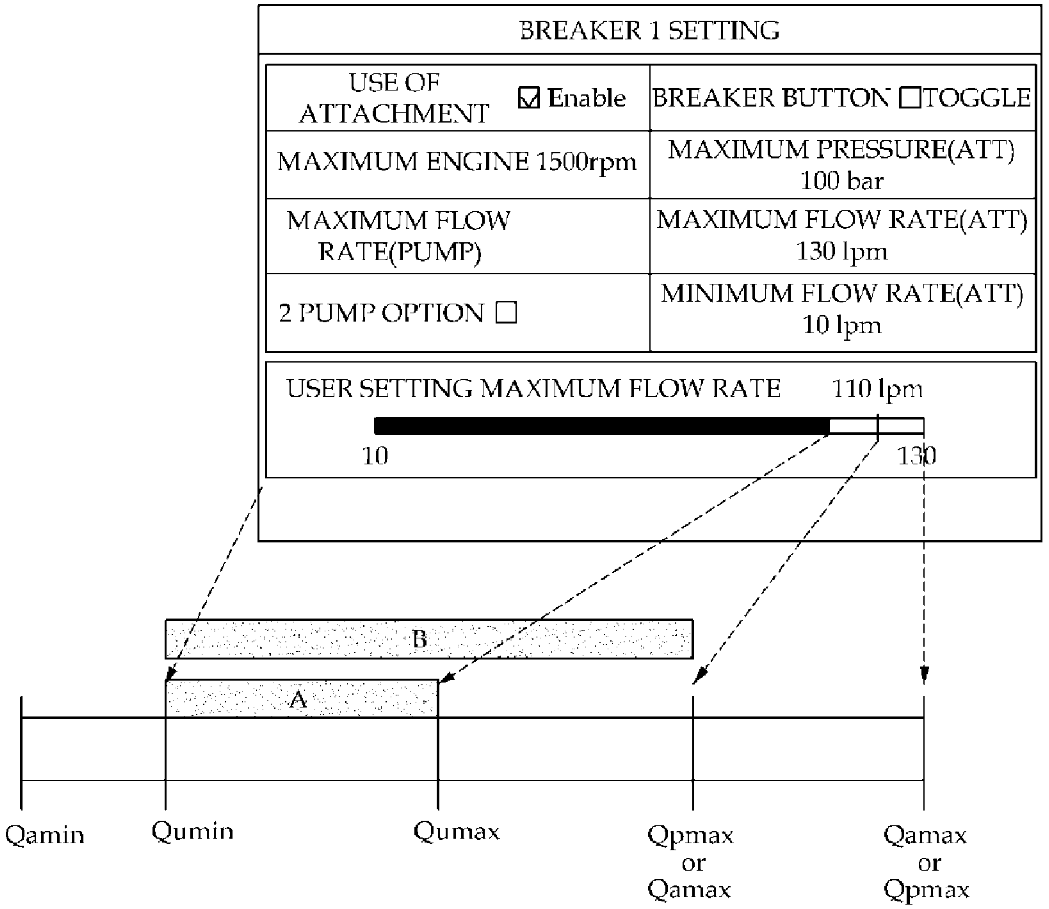
FIG. 6 is a graph for controlling a flow rate of an attachment according to the present disclosure.

FIG. 6 illustrates a graph for controlling a flow rate of an attachment according to the present disclosure.

In FIG. 6, Qamin refers to a minimum flow rate according to an attachment specification, Qamax refers to a maximum flow rate according to the attachment specification, and Qpmax refers to a maximum flow rate which the pump of a vehicle may maximally discharge in accordance with the engine rpm.

Further, Qumin refers to a minimum flow rate of an attachment, which is set by the user, and Qumax refers to a maximum flow rate of an attachment, which is set by the user.

In the method of controlling a flow rate of an attachment for construction equipment of the present disclosure, a flow rate control range (B) through adjustment of the engine rpm together with adjustment of the angle of the swash plate is larger than a flow rate control range (A) through adjustment of the angle of the swash plate of the pump.

The present disclosure described above is not limited to the aforementioned description, and it is apparent to the person skilled in the art that various substitutions, modifications, and alterations may be possible without departing from the technical spirit of the present disclosure.

The present disclosure achieves convenience of adjusting a flow rate of an attachment by allowing a control range of a flow rate of an attachment to be enlarged, and allows work, which may not be performed only by controlling the flow rate through adjustment of the angle of the swash plate, to be performed.

Although the present disclosure has been described with reference to exemplary and preferred embodiments, workers skilled in the art will recognize that changes may be made in form and detail without departing from the spirit and scope of the disclosure.

The invention claimed is:

1. A method, comprising:

receiving, by a control device of construction equipment in which an engine and a pump are connected to the control device, control information according to equipment characteristics, user setting information from an instrument panel, or engine rpm adjustment information through an engine control dial; and controlling, by the control device, a flow rate of an attachment coupled to the construction equipment, which performs specific work using working oil supplied from the pump, the controlling of the flow rate comprising:

selecting an optimum engine rpm corresponding to the attachment connected to the construction equipment;

selecting a flow rate range to be used in the attachment; and resetting the flow rate range of the attachment by resetting the engine rpm when a maximum flow rate in the selected flow rate range is higher than a maximum pump flow rate dischargeable by the pump at a preset engine rpm.

2. The method of claim 1, wherein the selecting of the optimum engine rpm selects from a list in which preset engine rpms are listed for each attachment connectable to the construction equipment.

3. The method of claim 1, wherein in the selecting of the flow rate range to be used in the attachment, the instrument panel provides information on a flow rate range of the attachment, which is selected by a user, a maximum flow rate range dischargeable at a present engine rpm, and a maximum flow rate usable by the attachment.

4. A method, comprising:

receiving, by a control device of construction equipment in which an engine and a pump are connected to the control device, control information according to equipment characteristics, user setting information from an instrument panel, or engine rpm adjustment information through an engine control dial; and controlling, by the control device, a flow rate of an attachment coupled to the construction equipment, which performs specific work using working oil supplied from the pump, the controlling of the flow rate comprising:

selecting an optimum engine rpm corresponding to the attachment connected to the construction equipment;

selecting a maximum flow rate to be used in the attachment;

comparing the selected maximum flow rate with a maximum pump flow rate dischargeable by the pump at a preset engine rpm; and resetting the flow rate of the attachment by resetting the engine rpm when the selected maximum flow rate is higher than the maximum pump flow rate in the comparing.

5. The method of claim 4, wherein in the selecting of the maximum flow rate to be used in the attachment, the instrument panel provides information on a maximum flow rate of the attachment, which is selected by a user, a maximum flow rate dischargeable at a present engine rpm, and a maximum flow rate usable by the attachment.

* * * * *